Patented Sept. 18, 1951

2,568,658

UNITED STATES PATENT OFFICE 2,568,658

METHOD OF POLYMERIZING POLY-UNSATURATED ESTERS

Frank B. Pope, Cuyahoga Falls, Ohio, assignor to The B. F. Goodrich Company, New York, N. Y., a corporation of New York No Drawing. Application March 12, 1947, Serial No. 734,227

4 Claims. (Cl. 260—77.5)

This invention relates to improvements in the art of polymerizing or heat-setting of large masses of polymerizable material for the ultimate production of large cast or molded articles free from strains, flaws and bubbles. The invention particularly relates to the production of hard, clear, non-thermoplastic articles having thick cross-sections by the polymerization of poly-unsaturated esters such as polyacrylate esters and polyallyl esters, particularly the di-(allyl carbonate) esters of polyhydroxy compounds such as the alkylidene bis phenols.

Large molded articles, castings or thick sheets of hard, non-thermoplastic resins have hitherto been difficult to produce free of strains or flaws. This is particularly true when working with poly-unsaturated esters since these polymerize with the liberation of such great quantities of heat that heat dissipation in larger sized articles becomes exceedingly difficult. If the heat of polymerization is not dissipated, it will build up in the interior of the cross section and accelerate the liberation of still more heat (the reaction becomes auto-catalytic). Moreover, in the polymerization of these materials, a large proportion of the heat of polymerization is liberated in a relatively short time while gelling of the monomer takes place. It has been observed that this relatively large temperature rise at gelation is frequently of the order of 75 to 85° C. in magnitude in a cross section as small as ½ inch. This heat liberation produces still other undesirable effects, for example, the high temperatures decompose the organic peroxides generally used as polymerization catalysts with the result that the finished article is undesirably colored rather than clear. Accordingly, it is highly desirable that temperatures at the gel point be kept within safe limits, if it is desired to carry the polymerization to completion and to produce hard, clear polymerizates.

When it is attempted to cast polymerize these polyunsaturated esters at usual temperatures, say of 70 to 90° C., and to produce castings having thick cross sections, say of 1 to 6 inches or more in thickness, the resulting polymer casting will show cracks and strains, and it will be found difficult to carry the polymerization to completion to obtain the requisite degree of hardness and the desired index of refraction for certain optical work. Accordingly, it has been the custom heretofore to conduct the cure or polymerization of large, thick castings at much lower temperatures. It has also been the custom to heat the monomer for long periods at lower temperatures until gelation has occurred, and then to carry out the final polymerization at a higher temperature. Both of these methods, however, involve an expenditure of much time thereby greatly increasing cost of castings for optical purposes.

It is an object of this invention, therefore, to provide a polymerization process whereby large casts or molded articles of hard, non-thermoplastic, resinous materials, especially polymers of polyunsaturated esters, may be produced which are free of strains and flaws and are of a high order of optical clarity. A further object is to provide a method of utilizing waste polymer of this class of materials in the formation of new molded or cast articles.

I have found that these and other objects may be attained by first polymerizing the unsaturated monomeric material to form a hard, non-thermoplastic, insoluble polymer, pulverizing this polymer, or otherwise wasted polymer, admixing the finely-divided polymeric material with a monomeric material of the same class, and thereafter polymerizing the monomeric material to knit the pulverulent polymeric material to a clear homogenous mass.

According to this invention, therefore, finely-divided particles of hard, non-thermoplastic, insoluble polymers are admixed, dispersed, or otherwise associated with monomeric material to form a slurry-like mixture, and the slurry is then placed in a forming device such as a mold or on a casting surface, and heated until the monomeric material is polymerized. By this method the amount of heat liberated in the interior of the mass undergoing polymerization is reduced, and the molding or casting operation is more easily controlled. Accordingly, articles having cross sections of 1 to 6 inches or more are secured which are free from strains and flaws and which are unusually hard and clear, and especially adaptable for optical purposes.

The polyunsaturated esters preferably utilized in this invention, as the monomeric material and to prepare the polymeric material, are of the general structure:

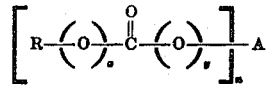

wherein R is an alkenyl radical containing a methylene (CH$_2$) group attached by a double bond to a carbon atom; $x$ and $y$ are numbers from 0 to 1 inclusive the sum of which is at least 1 but no more than 2, $n$ is an integer greater than 1 and A is an inactive organic radical having a valence equal to the value of $n$ and having its connecting valences attached to separate carbon atoms.

In this structure R may be vinyl, allyl, methallyl, isopropenyl or any other alkenyl radical containing the

structure; preferably however R containing from two to five carbon atoms.

When $x$ is 1 and $y$ is 1, as is especially preferred, the compounds are polyunsaturated carbonate esters; when $x$ is 0 and $y$ is one, the compounds are polyesters of unsaturated carboxylic acids with polyhydric alcohols such as the polyacrylate and polymethacrylate esters of polyhydric alcohols and when $x$ is 1 and $y$ is zero the compounds are polyesters of unsaturated alkenols with polycarboxylic acids such as the polyallyl and polymethallyl esters of polycarboxylic acids. When $n$ is 2, as is preferred, the compounds are diesters, but $n$ may also be 3, 4 or even more in many instances.

The radical A is preferably an inactive radical such as a hydrocarbon radical, a radical containing carbon, hydrogen and halogen (chlorine, bromine, iodine or fluorine) only, or a radical containing carbon, hydrogen and ether or ester oxygen atoms only, although A may also contain functional groups such as keto groups, sulfo groups, hydroxy groups, carboxylic acid groups, amine groups, etc. Still more preferably, A is an inactive aromatic radical having its valences on nuclear carbon atoms such as the radicals derived by removing the OH groups from a polyhydric phenol or halogenated polyhydric phenol, and especially the alkylidene bis-phenols and halogenated alkylidene bis-phenols.

Typical examples of preferred compounds included within the class of compounds of the above structure are as follows:

(A) Dialkenyl carbonate esters of the formula

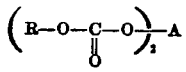

such as ethylene glycol bis-(allyl carbonate), diethylene glycol bis-(allyl carbonate), resorcinol bis-(allyl carbonate), catechol bis-(methallyl carbonate), 1,4-di-(allyl carbonate)-2,3-dichlorobenzene, 2,2-bis-(4-allyl - carbonato - phenyl) propane of the structure

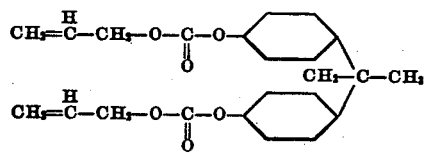

and similar dialkenyl carbonate esters of alkylidene bis-phenols and nuclear halogenated alkylidene bis-phenols of the general structure

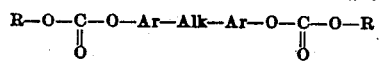

wherein R is the same as set forth above, preferably an allyl radical; Ar is an arylene or nuclear halogenated arylene radical having its connecting valences on nuclear carbon atoms and Alk is an alkylidene radical, among which are 2,2-bis-(3-phenyl-4-allyl - carbonato - phenyl) propane, 1,5-bis-(4-allyl-carbonato-phenyl) pentane, 2,2-bis-(5-chloro-4-allyl-carbonato-phenyl) propane, 2,2 - bis - (3-chloro-4-allyl-carbonato-phenyl) propane, 2,2-bis-(3,5-dichloro-4-allyl-carbonato-phenyl) propane, 2,2-bis-(3,5-dibromo-4-allyl-carbonato-phenyl) propane and the like.

(B) Diacrylate esters of polyhydric alcohols and phenols and similar compounds of the formula

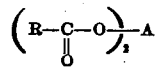

such as ethylene glycol diacrylate, ethylene glycol dimethacrylate, hydroquinone diacrylate, the diacrylate of 2,2-bis-(4-hydroxy-phenyl) propane and similar diacrylates of alkylidene bis-phenols and nuclear halogenated bis-phenols of the general formula

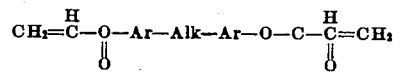

wherein Ar and Alk are the same as defined under (A) hereinafter such as the diacrylates of 2,2-bis-(3-chloro-4-hydroxy-phenyl) propane, 2,2-bis-(3,5-dichloro-4-hydroxy-phenyl) propane, 1,5-bis-(4-hydroxy-phenyl) pentane and the like; and the corresponding dimethacrylates, etc.

(C) Dialkenyl esters of polycarboxylic acids such as diallyl sebacate, diallyl adipate, diallyl succinate, diallyl phthalate, and the like and other compounds of the formula

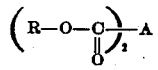

Still other compounds within the general formula set forth above include glyceryl tris(allyl carbonate), triallyl citrate, the diallyl esters of ethylene glycol dioxolate, the dimethallyl ester of diethylene glycol dimalonate and the like.

All these compounds possess at least two carbon to carbon double bonds separated by an ester linkage and in general any such compound will polymerize to a hard, non-thermoplastic resin and may be used in the invention. Triallyl phosphate, diallyl carbonate, allyl crotonate and allyl methacrylate are further examples of compounds of this type which, however, are not of the preferred class included in the general formula set forth above.

Any of the above polyunsaturated esters may be converted to the polymeric condition, and then pulverized and admixed with any of the monomeric polyunsaturated esters or with mixtures of the monomeric polyunsaturated esters. The polymer-monomer mixture is then placed in a forming device and heated.

The polymers of the polyunsaturated esters described above are essentially insoluble in the monomeric esters. Neither are such polymeric materials swelled by the monomeric materials. Moreover, the polymeric materials are exceedingly non-thermoplastic in nature and do not swell or dissolve when heated in the presence of the monomeric materials. It is surprising, therefore, that these polymeric resinous materials may be admixed with monomeric esters and cast into perfectly fused objects and sheets of high optical clarity.

In the practice of the invention, the polymeric material is ground or broken up into a particle size convenient to handle and to mix into the liquid monomeric material. In general clarity of the final product decreases with decrease in the particle size of the ground polymer. This may be due to the difficulty encountered in removing air from a system containing polymer dust of extremely small particle size. Generally considered too fine for satisfactory use is a dust passing a 100 or 200-mesh screen. On the other hand, the coarsely crushed polymer material of 3 or 4-mesh size is too coarse, for such size particles do not produce smooth slurries which handle advantageously in the method of this invention. Best results have been obtained when using a polymer material ground to size corresponding to that which just passes a 10 to 50-mesh screen. However, when a high degree of optical clarity is not desired, as when opaque or colored castings are being produced, the particle size of the polymeric material is not so important, the only limiting factors being that the particle size be not too large as to produce cracks and flaws in the final casting so as to weaken it, or that the particle size of the polymeric material be not too fine as to carry large quantities of entrapped air into the slurry as to result in sponginess or blow-holes in the final castings.

In the practice of the present invention it is preferable that the liquid monomeric material should be first admixed with a suitable polymerization catalyst such as any of the organic peroxides such as diacetyl peroxide, acetyl benzoyl peroxide, dibenzoyl peroxide, dicaprylyl peroxide, di-o-chlorobenzoyl peroxide, ditoluyl peroxide and the like. In casting of sheets and plates, it may also be advantageous to utilize the activating influence of actinic light, as is well understood in the art.

The catalyst may be added to the monomeric material in the form of a solution of the peroxide in an appropriate solvent, or the peroxide may be finely pulverized before addition to the monomer. Grinding of granular benzoyl peroxide, for instance, is easily accomplished after addition to the hot monomer by the use of equipment such as the Eppenbach Homomixer or similar stirring devices. If extreme optical clarity is desired in the final casting, it is preferable to use benzoyl peroxide of highest purity which is finely ground and added to the hot monomer with stirring until solution occurs.

In producing a casting or molded article, the ground polymer is preferably added to the catalyzed monomer and the resulting slurry (at a temperature of 50 to 100° C.) is cast on a surface or placed in a mold. The slurry is then held at this temperature until all air bubbles have risen to the surface and broken. If the slurry is to be covered, covers or inserts should then be placed on the slurry, with care being exercised to entrap no air. Alternatively, the surface may be left free with no cover being used. The slurry is then heated preferably at a temperature 70 to 100° C. until gelling of the liquid has occurred. A blanketing agent such as glycerine is then preferably poured upon the gel, or cellophane or some other film is laid thereon, in order that the final polymerization takes place in the absence of atmospheric oxygen, since oxygen will render the surface of the object sticky if present during the cure. Alternatively, the gel is placed in a closed mold. Heating is then continued until polymerization is completed and the requisite degree of hardness has been obtained. Cooling should take place gradually in order that a strain-free product may result.

The following specific examples are intended to illustrate more fully the nature of the invention, but are not to be construed as a limitation upon the scope thereof.

*Example I*

12.9 parts of a hard clear polymer of 2,2-bis-(3 - chloro - 4 - allyl-carbonato-phenyl) propane (Barcol Impressor hardness of 30 to 32) were extracted in a quantity of acetone until the polymer was disintegrated. The disintegrated material was filtered and dried. The resulting flakes were hard and white, while the acetone filtrate was slightly yellow in color, showing that some soluble material was removed from the polymer. After extraction, 9.6 parts of insoluble polymer remained. This 9.6 parts of insoluble polymer was ground to 20-mesh and then dispersed in 20 grams of monomeric 2,2-bis-(3-chloro-4-allyl-carbonato-phenyl) propane in which 2% by weight of benzoyl peroxide had been dissolved. The resulting slurry was run into a mold, the mold was then evacuated, and the air replaced with nitrogen. The mold was placed in an oven, heated to 70° C. until gelled and then heated therein at 85° C. until the final article was as hard as the original polymeric material. The time required for the complete curing cycle was only eight hours. Adhesion of the discrete particles of polymer one to the other was perfect, and the final casting was fully as strong as the original polymer.

*Example II*

Polymers of 2,2-bis-(3-chloro-4 - allyl - carbonato-phenyl) propane were prepared in a number of different colors by polymerizing the monomer in the presence of suitable dyes. The colored polymers were ground to 10-mesh and suspended in an equal weight of clear monomeric 2,2-bis-(3 - chloro - 4 - allyl - carbonato-phenyl) propane containing 2% by weight of benzoyl peroxide. The resulting polymer monomer slurry was then heated as described in Example I. The monomer was viscous enough at temperatures of 70 to 85° C. to hold the polymer particles suspended so as to prevent settling of the particles. The final product was attractive in appearance having variegated discrete colored particles dispersed in a clear plastic material. Adhesion of the clear new plastic material with the colored particles was perfect. It was found that striking effects could be produced by pouring the colored particles of the polymer into the monomer and that materials much resembling onyx in appearance could be secured.

The method of incorporating the polymeric material into the monomeric material may vary with the percentage of polymer added to the monomer. For quantities of polymer as low as 5 to 50% of the monomer, simple stirring will suffice. For higher percentages, say 50 to 100% or more, a suitable solvent for the monomer is preferably used to obtain good distribution of the monomer and catalyst over the surface of the polymer particles. For example, a solution of monomer and catalyst in a solvent may be added to a solvent suspension of polymer dust and the solvent then evaporated to leave a uniform mixture of polymer, monomer and catalyst.

The proportions of the polymer dust which may be associated with the monomeric material may be as little as 5% or as high as 10, 20, 30, 40, 50 or 60% or more of the mixture if opaque castings or highly colored castings are being produced. Exceptionally clear transparent castings have been produced with as much as 40% by weight of polymer dust. The polymer dust may even be associated with a smaller amount of monomer in solution, and the solvent removed to leave the discrete particles coated with a fine film of the monomeric material. The powder then may be compacted, evacuated and heated to polymerize the monomer. Such a mixture may be polymerized quite rapidly.

The polymer-monomer slurries prepared according to the method of this invention exhibit the valuable property of a greatly reduced shrinkage upon polymerization. The reduction of the shrinkage during polymerization is proportional to the quantity of polymer dust used. The reduction in shrinkage greatly reduces the strains usually encountered in casting these non-thermoplastic resins and aids in producing clear and stronger castings.

The reduction in the heat of reaction achieved by polymerization of the unsaturated diesters according to the method of this invention promotes greater catalyst life with shorter curing cycle and permits the attainment of harder polymerizates.

While I have disclosed certain preferred manners of performing my invention, I do not thereby desire or intend to limit myself solely thereto, for, as indicated, the precise proportions of the materials utilized may be varied and equivalent chemical materials may be employed, if desired, without departing from the spirit and scope of the invention as defined in the appended claims.

I claim:

1. The method of producing hard, non-thermoplastic, strain-free articles from liquid polyunsaturated esters of the class having the general structure

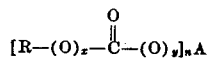

wherein R is an alkenyl group containing from 2 to 5 carbon atoms and containing a methylene ($CH_2$) group attached by a double bond to a carbon atom, $x$ and $y$ are numbers from 0 to 1 inclusive, the sum of which is from one to two, $n$ is an integer from 2 to 4, and A is an inactive organic radical having a valence equal to the value of $n$, having its connecting valences attached to separate carbon atoms, and containing in addition to hydrocarbon structure no substituent groups other than those selected from the class consisting of halogen atoms, keto groups, sulfo groups, carboxylic acid groups and amine groups, which method comprises preparing a mixture of monomeric and polymeric ester components consisting entirely of from 50 to 95% by weight of a liquid monomeric ester of said class and from 5 to 50% by weight of a hard, non-thermoplastic, completely insoluble polymer of an ester of said class in the form of particles which pass a 10 to 50 mesh screen to form a slurry of fine particles of polymer dispersed in said liquid monomeric ester, and then heating the slurry at a temperature of 50 to 100° C. to polymerize the said monomeric ester.

2. The method of claim 1 wherein the polyunsaturated ester is a diallyl ester of a polycarboxylic acid.

3. The method of claim 1 wherein the polyunsaturated ester is a bis-(allyl-carbonato-phenyl) alkane.

4. The method of claim 1 wherein the polyunsaturated ester is 2,2-bis-(3-chloro-4-allyl-carbonato-phenyl) propane.

FRANK B. POPE.

REFERENCES CITED

The following references are of record in the file of this patent:

UNITED STATES PATENTS

| Number | Name | Date |
|---|---|---|
| 2,340,111 | D'Alelio | Jan. 25, 1944 |
| 2,385,931 | Muskat et al. | Oct. 2, 1945 |
| 2,403,112 | Muskat | July 2, 1946 |
| 2,455,652 | Bralley et al. | Dec. 7, 1948 |
| 2,482,825 | Amos et al. | Sept. 27, 1949 |